United States Patent [19]

Keagle

[11] 4,014,517
[45] Mar. 29, 1977

[54] VARIABLE HEIGHT STAND

[76] Inventor: Walter S. Keagle, Collins, Iowa 50055

[22] Filed: Dec. 10, 1975

[21] Appl. No.: 639,450

[52] U.S. Cl. .................................. 254/45; 52/23; 52/126; 248/157; 248/163; 248/188.5; 248/352

[51] Int. Cl.² ..................... B66F 7/26; F16M 11/00

[58] Field of Search ................. 52/23, 126; 254/45, 254/93 R, 99; 248/157, 163, 421–423, 188.5, 351, 352, 354, 357

[56] References Cited

UNITED STATES PATENTS

| 732,418 | 6/1903 | King | 248/422 X |
|---|---|---|---|
| 1,631,513 | 6/1927 | Berry | 248/188.5 X |
| 1,754,974 | 4/1930 | Warfield | 248/421 X |
| 2,080,441 | 5/1937 | Shoop | 248/421 X |
| 2,183,427 | 12/1939 | Hou | 248/157 |
| 2,196,715 | 4/1940 | Wiedman | 248/354 S UX |
| 2,819,873 | 1/1958 | Pearne | 248/354 H X |
| 2,895,704 | 7/1959 | Urbain et al. | 248/354 R |
| 3,669,409 | 6/1972 | Eranosian | 254/45 |
| 3,709,467 | 1/1973 | Mann | 254/45 |
| 3,828,491 | 8/1974 | Koon et al. | 52/23 |
| 3,920,212 | 11/1975 | Westwood | 248/352 X |

FOREIGN PATENTS OR APPLICATIONS

| 1,296,338 | 5/1962 | France | 248/354 C |
|---|---|---|---|
| 966,801 | 9/1957 | Germany | 248/354 R |
| 7,148 | 3/1904 | United Kingdom | 248/351 |
| 878,714 | 10/1961 | United Kingdom | 248/421 |

Primary Examiner—Lawrence J. Staab
Attorney, Agent, or Firm—Burd, Braddock & Bartz

[57] ABSTRACT

A stand for support of a structure, as a mobile home, above the ground. The stand includes a generally flat base and a plurality of legs having lower ends pivotally assembled to the base. The legs extend in upwardly converging relationship away from the base and are pivotally connected at the upper ends to a support platform. The lower ends of the legs are movable on the base in such a fashion to raise and lower the support platform. Means are provided to secure the position of the lower ends of the legs to the base whereby the support platform may be positioned in firm, supportive relationship to the structure.

22 Claims, 8 Drawing Figures

U.S. Patent  Mar. 29, 1977  Sheet 1 of 2  4,014,517
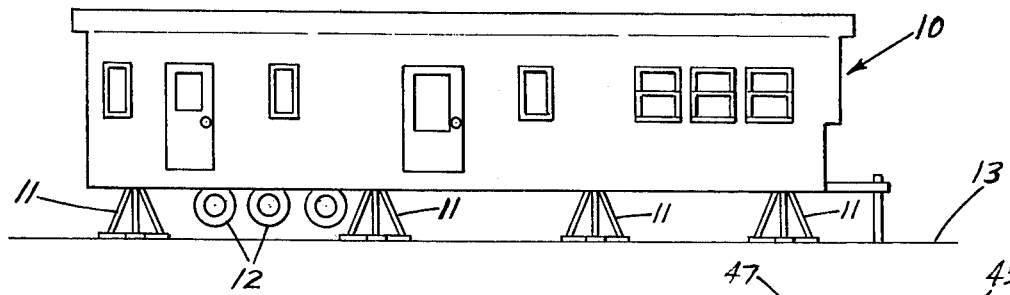
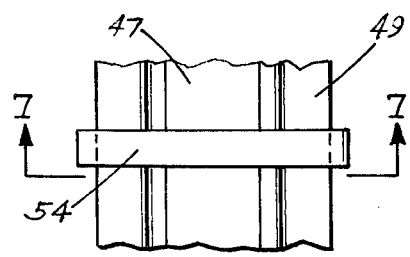
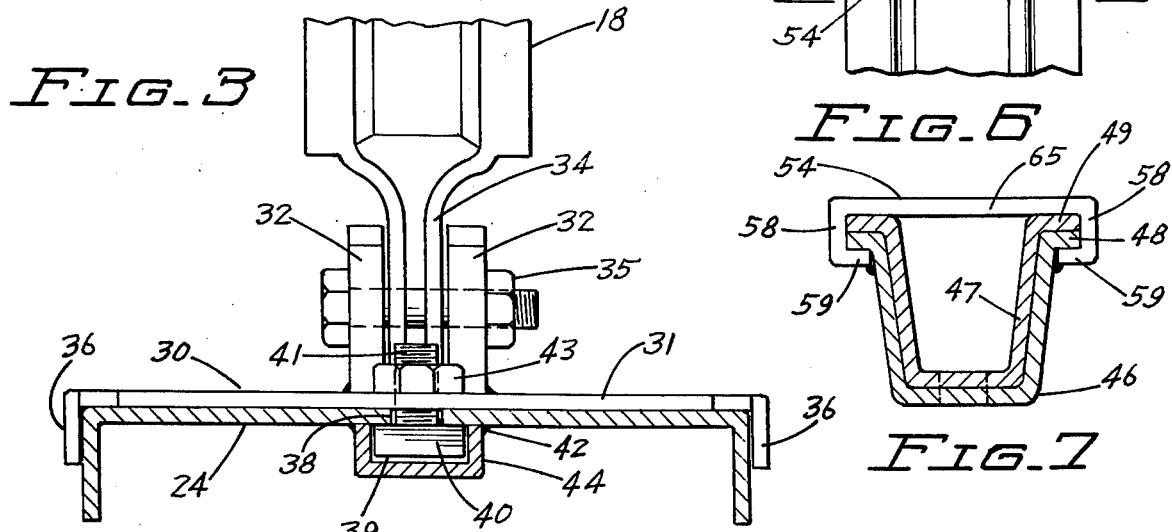
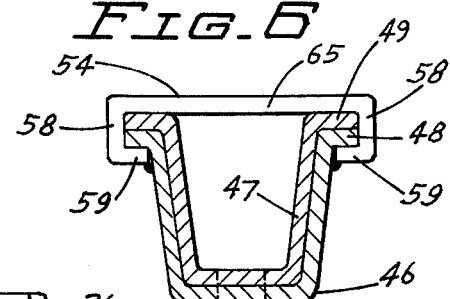
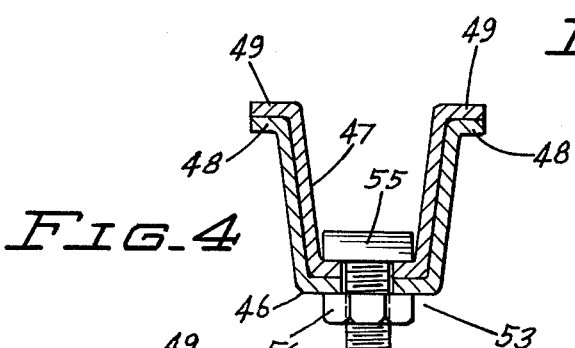
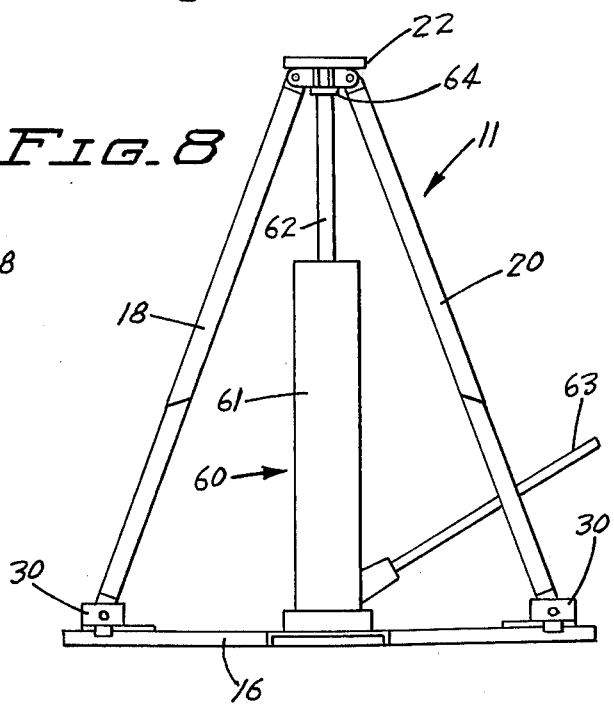
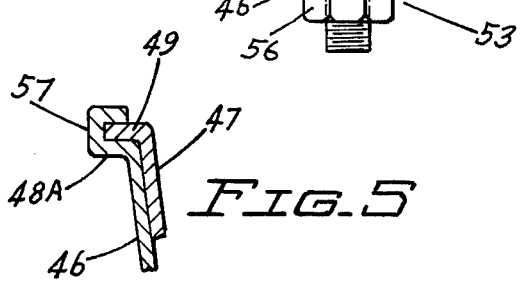

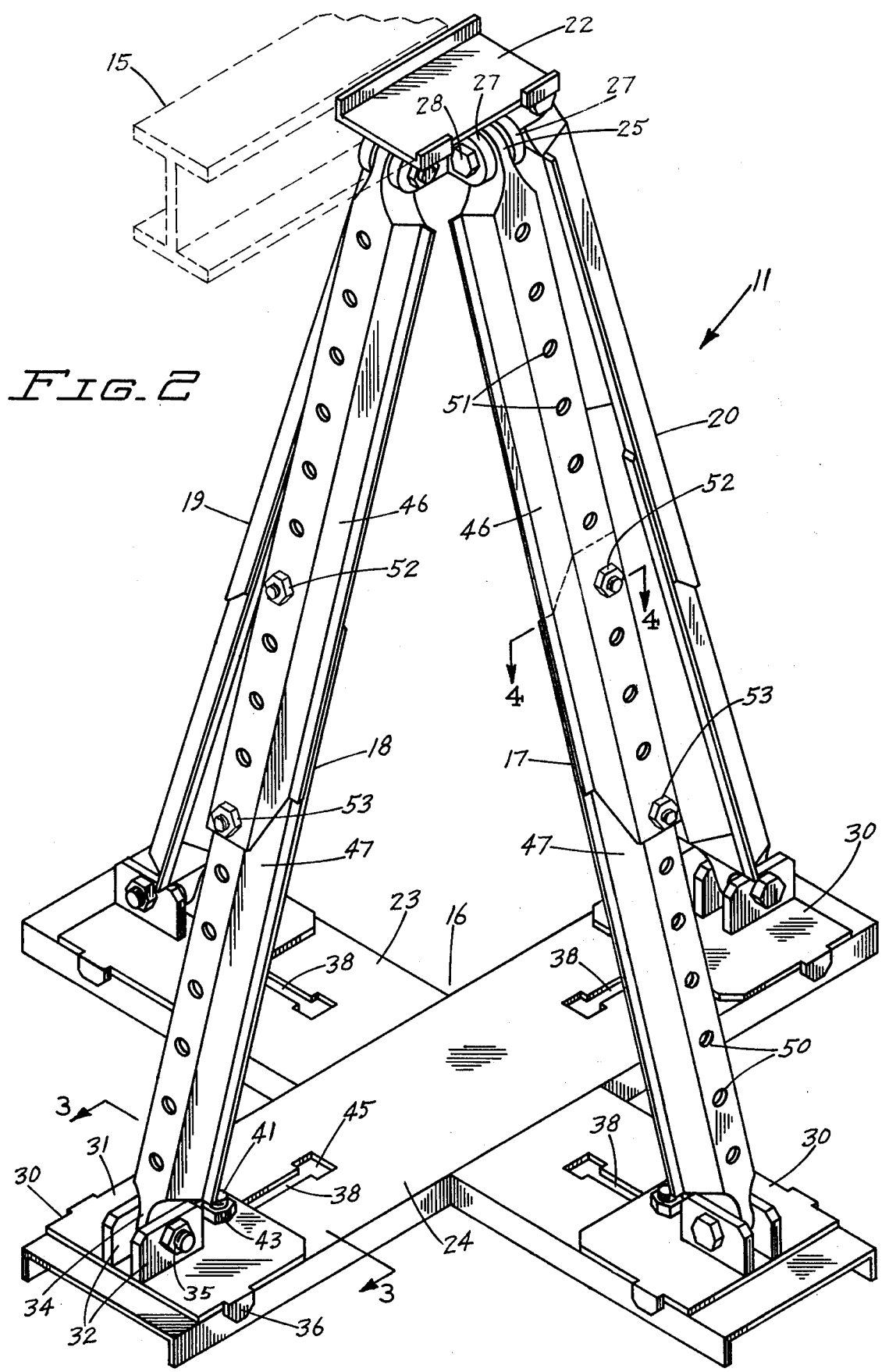

VARIABLE HEIGHT STAND

BACKGROUND OF THE INVENTION

The modular housing unit of the type known as a mobile home has long been a popular choice of living quarters, and more so in recent years as such homes have become larger and more gracious. On site, such homes are supported off the wheels and on a foundation which typically is constructed of concrete block that supports the corners and intermediate sections of the housing structure. The concrete block foundation can rest on the ground, a concrete slab or other supportive surface. From time to time, the housing structure is apt to shift as occasioned by settling of the ground, wind force or the like. The usual practice is to make leveling adjustments to the foundation by the insertion of shims. In order to maintain structural integrity of the housing unit, proper leveling is necessary from time to time, yet the use of such shims is cumbersome and unreliable.

SUMMARY OF THE INVENTION

The invention relates to a stand for supporting a modular housing unit and in particular that type known as a mobile home, although the stand is readily adaptable to support other structures as well. A plurality of such stands spaced around the housing unit can comprise the support foundation of the unit relative to the ground. The stand is readily and easily adjustable in height to permit correction of the level of the housing unit.

The stand includes a generally flat base which is solidly enagageable with the ground, and a plurality of legs extended upward from the base. The legs extend in converging relationship away from the base and have upper ends which are pivotally assembled to a support platform. The legs can be adjustable in length. The lower ends of the legs are assembled to the base for sliding movement relative thereto toward and away from one another. Means are provided to fix the position of the lower end of each leg to the base. Sliding of the base legs toward one another raises the support platform, and sliding of the legs in the opposite direction lowers the support platform. The support platform is engageable with a portion of the housing unit. With the support platform closely adjacent a portion of the housing unit, the lower ends of the legs are moved inward toward one another until the support platform is in tight engagement with the housing unit. Fastening of the lower ends of the legs to the base then fixes the stand in supporting relationship to the housing unit.

IN THE DRAWINGS

FIG. 1 is a side elevational view of a modular housing unit supported by a plurality of stands according to the present invention;

FIG. 2 is a perspective view of a stand according to the invention;

FIG. 3 is an enlarged sectional view of a portion of the stand of FIG. 2 taken along the line 3—3 thereof;

FIG. 4 is an enlarged sectional view of a portion of a stand of FIG. 2 taken along the line 4—4 thereof;

FIG. 5 is a fragmentary view similar to the sectional view of FIG. 4, showing a modified leg structure;

FIG. 6 is a fragmentary view of a leg of the stand of the invention having another modified leg structure;

FIG. 7 is a sectional view taken along the line 7—7 of FIG. 6; and

FIG. 8 is a side elevational view with portions removed for purposes of illustration, of a modified stand according to the invention.

DESCRIPTION OF PREFERRED EMBODIMENTS

Referring to the drawings, there is shown in FIG. 1 a modular housing unit 10 shown as the popular variety known as a mobile home. Housing unit 10 is supported by a plurality of stands 11 according to the present invention, such that its wheels 12 are elevated off the ground 13. Stands 11 are spaced apart about both sides of housing unit 10 and are variable in height in order to permit proper leveling of the housing unit 10. Housing unit 10 typically has elongate structural beams which span the length thereof beneath the floor and which are hidden by the edge of the housing unit shown in FIG. 1. Stands 11 are adapted for engagement of such beams in order to support the housing unit. Alternatively, stand 11 can be in supportive relationship to other structural components of housing unit 10.

Referring to FIG. 2, there is shown one of the stands 11 in supportive relationship to a structural beam 15 of a housing unit 10, shown as the type known as an I beam. Stand 11 includes a base 16 with a generally flat, co-planar top surface, legs 17–20 and a support platform 22. Base 16 is comprised of elongate, generally rectangular, first and second intersecting base plates 23, 24. Base plates 23, 24 form a symmetrical cross and are secured together by suitable or preferred means such as intersecting grooves and edges, welds and the like. Base 16 is relatively flat for supportive engagement with the ground or other supportive surface. Each base plate has side walls and a top wall defining a downwardly open channel.

Legs 17–20 extend upwardly at an inclination from base 16 in converging relationship. The upper end of each of the legs is pivotally connected by suitable fastening means to support platform 22. For example, the upper end 25 of leg 17 is narrowed and configured to be engaged between a pair of parallel, spaced apart lugs 27 connected to support platform 22. A nut and bolt assembly 28 connects upper end 25 of leg 17 between the lugs 27 to permit pivotal rotation of leg 17 about a horizontal axis.

The lower end of the legs are assembled for co-planar, guided movement on base 16 along guide ways or tracks provided thereon. The lower ends of the legs are symmetrically oriented about base 16 and are slidable on base 16 in a first, inward direction toward each other, and a second, outward direction away from each other. Movement of the legs in the inward direction moves the longitudinal axis of each leg toward a vertical orientation perpendicular to the plane of base 16 and results in raising of the platform 22. Conversely, movement of the lower ends of the legs in the outward direction results in a lowering of the platform 22 as the longitudinal axis of the legs moves towards a greater angular inclination with respect to the vertical.

The lower end of each leg is pivotally connected to a sliding foot pad assembly 30 which is inwardly and outwardly movable on base 16. Referring to FIGS. 2 and 3, and specifically referring to the leg 18 as exemplary, a foot pad assembly 30 includes a flat foot pad or plate 31 having a pair of parallel, spaced apart, upwardly projected ears 32 which straddle a plane along the projected path of movement of leg 18. The lower end of leg 18 is narrowed, as at 34, and is pivotally engaged between the ears 32 by suitable fastening means as a nut and bolt assembly 35.

The lateral dimension or width of foot plate 31 is coextensive with that of base plate 24, and on either side of foot plate 31 are fingers which project down over the lateral side walls of base plate 24. Fingers 36 straddle the base plate 24 to assist in guiding movement of foot plate 31 over the top surface of the base plate 24.

Locking means are provided to selectively lock or secure the position of foot pad assembly 30, and thus the lower end of leg 18, relative to base plate 24. An elongate slot 38 is located in base plate 24 corresponding to the path of travel of foot pad assembly 30, and opens to the lower channel defined by the base plate 24. A lock bolt 39 (FIG. 3) has a head 40 located beneath the horizontal surface of base plate 24, and a threaded shank 41 which extends upward through the slot 38. The head 40 of bolt 39 spans the slot 38 and bears against the adjacent edge portions of base plate 24. Shank 41 extends through a suitably provided hole in the foot plate 31. A locking nut 43 is threaded onto the shank 41. Tightening of the nut 43 on the shank 41 draws and secures the foot plate 31 to the base plate 24. The nut 43 is readily loosened to permit sliding movement of the foot plate 31 over the base plate 24.

An elongate channel shaped beam 44 is fixed to the lower surface of the top wall of base plate 24 as by a weld 42, and has side walls which are coextensive with and straddle slot 38. Head 40 of bolt 39 is preferably square, and the side walls of beam 44 are spaced close enough together such that the head 40 is captured there between and restrained from rotation. Rotation of nut 43 is thus accomplished without having otherwise to restrain head 40 from rotation. An enlarged opening 45 at the inside end of slot 38 permits insertion and removal of the head 40 of bolt 39.

Legs 17–20 of stand 11 are adjustable in length to enhance the usability of the stand. Viewing the leg 17 as exemplary, referring to FIGS. 2 and 4, the leg is comprised of a first or upper leg section 46 and a second or lower leg section 47 telescopically engaged with the upper leg section. The upper and lower leg sections 46, 47 both have a generally U-shaped or channel shaped cross section with outwardly extended side flanges 48, 49. The cross sectional dimensions of the lower leg section 47 are smaller than those of the upper leg section 46 such that an overlapping inner portion of the lower leg section 47 is snugly accommodated within the corresponding outer portion of the upper leg section 46. The lower leg section 47 has a plurality of spaced apart, fastening holes 50 and the upper leg section has a plurality of corresponding, spaced apart, fastening holes 51. Nut and bolt assemblies 52, 53 pass through corresponding fastening holes 50, 51 of the overlapping portions of the upper and lower leg sections 46, 47. The nut and bolt assemblies 52, 53 are removable such that the length of the leg 17 may be varied by varying the amount of overlap between the upper and lower leg sections 46, 47. Referring to FIG. 4, the bolt head 55 of nut and bolt assembly 53 has a transverse dimension substantially corresponding to the interior dimension between the side walls of the lower leg section 47 whereby the side walls restrain the head 55 from rotation. Upon tightening and loosening the nut 56 of nut and bolt assembly 53, further rotational restraint upon the head 55 is thus not required.

In the use of stand 11, preparatory to engagement of the stand with a structural element of the modular housing unit, as the beam 15, the foot pad assemblies 30 are moved to an outward location with respect to the guide slots 38. Beam 15 is lifted to the desired elevation with a remote jack (not shown) or other suitable implement. The length of the legs 17–20 is adjusted to roughly locate support platform 22 at the height of the lower surface of beam 15. Fastener assemblies 52, 53 are engaged with proper fastening holes 50, 51 to locate platform 22 just beneath the beam 15. The foot pad assemblies 30, and thus the lower ends of the legs 17–20, are then moved inward of the slots 38 to thus raise the support platform against the beam 15. When the support platform 22 is firmly seated with respect to the beam 15, the nuts 43 of the foot pad assemblies 30 are tightened to securely locate the lower ends of the legs 17–20 in position to maintain the support platform 22 in supportive relationship to the beam 15. The remote jack can be removed and taken to another location on the modular housing unit for installation of another stand 11. When necessary, adjustment of the height of the support platform 22 is easily made by bracing the beam 15, loosening the foot pad assemblies 30, and making the necessary adjustment by raising or lowering the support platform 22. The use of shims is eliminated and the exact elevation desired is achieved.

In FIGS. 5–7, modified leg structures of stand 11 are shown, which interlock the first and second leg sections to prevent disengagement while permitting telescopic movement. According to the modification of FIG. 5, the outwardly extended side flange 48A of the upper leg section 46 terminates in a reverse turned or inwardly facing U-shaped lip 57 on both sides of upper leg section 46. At the overlapping portions of the upper and lower leg sections 46, 47 the side flange 49 of lower leg section 47 is slidably engaged in the lip 57 of upper leg 46. Telescopic movement of the leg sections is still permitted, but the leg sections remain in engagement upon removal of the nut and bolt assemblies 52, 53. It may be seen that instead, a lip could be provided on the flange 49 of the lower leg 47 which would extend over the flange 48 of the upper leg 46 to provide the same result.

Another modified leg structure is shown in FIGS. 6 and 7 where FIG. 6 is a view looking into the channel of a leg on a portion where the upper and lower leg sections overlap. A bracket 54 has arms 58 attached at one end to the side flanges 48 of the upper or outer leg section 46 as by having inwardly directed members 59 which are welded to the flanges 48. A bar 65 connects the other ends of the arms 48 and spans the channel of the upper leg section 46, being spaced from the flanges 48 a sufficient distance for engagement of the flanges 49 of the lower leg section 47. The flanges 49 of lower leg section 47 are slidably accommodated in the space between the bar 65 and the flanges 48 of the upper leg section whereby telescopic movement is permitted but the leg sections are held in engagement when the nut and bolt assemblies 52, 53 are removed. Instead of the bar 54, there can be U-shaped brackets attached to the flanges 48 and extending over the flanges 49 of the lower leg section 47. One or more of the brackets 54 can be provided along a leg section on that portion of the leg section which might overlap with another leg section.

Referring to FIG. 8, there is a modified stand 11 shown having a front leg removed for purposes of illustration. A jack 60 is centrally located on base 16 of stand 11 beneath support platform 22 and between the stand legs 18, 20. Jack 60 is of the hydraulic variety having a cylinder 61 and an extendible and retractable plunger 62. Operation of a handle 63 introduces hydraulic fluid into the cylinder 61 to extend the plunger 62 as is known in the art. A head 64 on the end of plunger 62 bears against the lower surface of support platform 22. Other types of jacks can be used.

In use, the purpose of jack 60 is to effect raising of support platform 22 when engaging a structural member of the modular housing unit. With the foot pad assemblies 30 loosened and the stand legs adjusted to roughly the correct height, jack 60 is operated by operation of handle 63 to raise the support platform 22, and hence the structual member of the modular housing unit, to just the correct height. When that is accomplished, the foot pad assemblies 30 are tightened in place to fix the height of the stand. The jack 60 can then be removed and used at another location.

While there has been shown and illustrated a stand having four legs, it is apparent that the stand could have more or less than four legs. It will be apparent to those skilled in the art that other modifications to the invention can be made without departing from the scope and spirit of the invention.

The embodiments of the invention in which an exclusive property or privilege is claimed are defined as follows:

1. A stand for support of a structure, comprising:
a generally flat base;
at least three symmetrically orientated, linear legs extending generally upward from the base;
a support platform supportively engageable with a part of the structure;
a first end of each leg being pivotally assembled to the support platform for rotation about a horizontal axis with respect to the platform;
assembly means movably assembling a second end of each leg to the base positioning said second ends on the base so that the legs extend from the base to the platform in converging relationship toward said platform, the second end of each leg being slidably movable on the base in a first direction toward one another to move the platform away from the base, and a second direction away from one another to move the support platform toward the base;
said assembly means including guide means on the base to guide movement of the second end of each leg in said first and second directions; and
releasable lock means to releasably secure the second end of each leg from movement on the base.

2. The stand of claim 1 wherein: said guide means includes slot means, said second end of each leg having a portion engageable in the slot means for guidance of movement of the second end of each leg.

3. The stand of claim 2 wherein: said assembly means includes a plurality of foot pad assemblies, a first end of each leg being pivotally assembled to the support platform, a second end of each leg being pivotally assembled to a foot pad assembly, said foot pad assemblies being movable on said base over the slot means for movement guided by the slot means.

4. The stand of claim 3 wherein: said slot means includes a slot in the base associated with each foot pad assembly, a nut and bolt assembly associated with each foot pad assembly passing through the slot and being able to be tightened to prevent movement of the foot pad assembly on the base, and to be loosened to permit movement of the foot pad assembly on the base.

5. The stand of claim 3 wherein: said base includes a first rectangular base plate and a second rectangular base plate disposed in intersecting relationship to the first base plate, and each having a top wall and lateral side walls, each foot pad assembly positioned for movement on the top wall of a base plate and having fingers projecting down over the lateral side walls of the base plate to assist in guiding movement of the foot pad assembly.

6. The stand of claim 1 including: means positioned on the base operative to selectively raise the support platform relative to the base.

7. The stand of claim 6 wherein: said means operative to raise the support platform includes a jack.

8. A stand for support of a modular housing unit, comprising:
a generally flat, ground engageable base;
at least three linear legs having longitudinal axes angularly extending from the base;
a support platform supportively engageable with a part of the housing unit;
the upper ends of said legs being pivotally assembled to the platform for pivotal movement about a horizontal axis relative to the platform;
assembly means movably assembling the lower end of each of said legs to the base positioning said lower ends on the base so that the longitudinal axes of the legs extend in upwardly converging relationship to the platform, and permitting co-planar, guided movement of said lower ends in a first direction toward one another to move the longitudinal axis of each leg toward a vertical orientation and raise the platform, and in a second direction opposite the first direction to move the longitudinal axis of each leg away from a vertical orientation and lower the platform;
said assembly means including guide means on the base to guide movement of the lower end of each of the legs; and
releasable locking means to releasably secure the lower end of said legs from movement on the base.

9. The stand of claim 8 including: means for adjusting the length of said legs.

10. The stand of claim 8 wherein: said plurality of legs includes four symmetrically positioned legs and each leg includes a first leg section and a second leg section telescopically assembled to the first leg section, and means to secure the first and second leg sections together.

11. The stand of claim 10 wherein: said leg sections have fastening holes, said means to secure the first and second leg sections including nut and bolt assemblies engageable in fastening holes of overlapping portions of the first and second leg sections.

12. The stand of claim 10 wherein: said leg sections are channel shaped and fit together with a portion of a first leg section snugly accommodated in the channel of a second leg section, and including means to interlock the leg sections.

13. The stand of claim 12 wherein: said leg sections have outwardly extended side flanges and said means to interlock said leg sections includes reverse turned lips on the side flanges of one leg section engageable with the side flanges of the other leg section.

14. The stand of claim 12 wherein: the means to interlock the leg sections includes a bracket on the second leg section extending over at least a portion of the channel thereof defining a space for engagement of a portion of the first leg section.

15. The stand of claim 8 wherein: guide means on the base to guide movement of the lower ends of the legs includes slot means.

16. The stand of claim 8 including: a plurality of foot plates, one foot plate corresponding to each leg, the lower end of each leg being pivotally assembled to a foot plate, each said foot plate being slidable on the top surface of said base.

17. The stand of claim 16 wherein: each leg includes a first section and a second section telescopically engaged with the first section for adjustment of the length of the leg, and releasable means for securing the first section and the second section together.

18. The stand of claim 16 wherein: said guide means includes a plurality of slots on said base, one slot correpondingly to each foot plate and coextensive with the path of guided travel of the lower end of the leg, and means on the foot plate coacting with the slot to guide a movement of the foot plate along the slot.

19. A stand for support of a modular housing unit, comprising:
   a base;
   a plurality of legs angularly extending from the base in upwardly converging relationship;
   a support platform supportively engageable with a part of the housing unit;
   the upper ends of said legs being pivotally assembled to the platform;
   the lower ends of said legs being movably assembled to the base for movement in a first direction toward one another to raise the platform, and in a second direction opposite the first direction to lower the platform;
   a plurality of foot plates, one foot plate corresponding to each leg, the lower end of each leg being pivotally assembled to a foot plate, each said foot plate being slidable on the top surface of said base;
   guide means on the base to guide movement of the lower ends of said legs, said guide means including a plurality of slots on said base, one slot corresponding to each foot plate and coextensive with the path of guided travel of the lower end of the leg, and means on the foot plate coacting with the slot to guide movement of the foot plate along the slot including a nut and bolt assembly having a bolt with a head located on the side of the base opposite the foot plate, said bolt having a shank passing through the slot and foot plate, and a nut threaded on the shank on the side of the foot plate opposite the slot, said nut being able to be tightened to secure the lower end of the leg and to be loosened to permit guided movement of the lower end of the leg; and
   releasable locking means to releasably secure the lower end of said legs from movement on the base.

20. A stand for support of a modular housing unit, comprising:
   a base;
   a plurality of legs angularly extending from the base in upwardly converging relationship;
   a support platform supportively engageable with a part of the housing unit;
   the upper ends of said legs being pivotally assembled to the platform;
   the lower ends of said legs being movably assembled to the base for movement in a first direction toward one another to raise the platform, and in a second direction opposite the first direction to lower the platform;
   a plurality of foot plates, one foot plate corresponding to each leg, the lower end of each leg being pivotally assembled to a foot plate, each said foot plate being slidable on the top surface of said base;
   guide means on the base to guide movement of the lower ends of said legs;
   said base including a first rectangular base plate and a second rectangular base plate disposed in intersecting relationship to the first base plate, and each having a top wall and lateral side walls, each foot plate positioned for movement on the top wall of a base plate and having fingers projecting down over the lateral side walls of the base plate to assist in guiding movement of the foot plate; and
   releasable locking means to releasably secure the lower end of said legs from movement on the base.

21. The stand of claim 16 including: means located on the base operative to selectively raise the support platform.

22. The stand of claim 21 wherein: said means operative to raise the support platform includes a jack.

* * * * *

UNITED STATES PATENT AND TRADEMARK OFFICE
CERTIFICATE OF CORRECTION

PATENT NO. : 4,014,517
DATED : March 29, 1977
INVENTOR(S) : WALTER S. KEAGLE

It is certified that error appears in the above-identified patent and that said Letters Patent are hereby corrected as shown below:

Column 3, line 6, after "fingers", insert --36--.

Column 4, line 45, "provide" should be --produce--.

Column 5, line 47, after "move the", insert --support--.

Column 7, line 21, Claim 18, "correpondingly" should be --corresponding--.

Column 7, line 24, omit "a" before --movement--.

Signed and Sealed this

Fourteenth Day of June 1977

[SEAL]

Attest:

RUTH C. MASON
Attesting Officer

C. MARSHALL DANN
Commissioner of Patents and Trademarks